United States Patent
Yeh et al.

(10) Patent No.: US 8,321,767 B2
(45) Date of Patent: Nov. 27, 2012

(54) PACKET PROCESSING APPARATUS AND METHOD CAPABLE OF GENERATING MODIFIED PACKETS BY MODIFYING PAYLOADS OF SPECIFIC PACKETS IDENTIFIED FROM RECEIVED PACKETS

(75) Inventors: Chin-Wang Yeh, Hsinchu (TW); You-Min Yeh, Taipei (TW); Rong-Liang Chiou, Hsinchu (TW); Yu-Hsiung Deng, Hsin-Cju Hsien (TW); Ching-Chieh Wang, Yilan County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 356 days.

(21) Appl. No.: 12/624,411

(22) Filed: Nov. 24, 2009

(65) Prior Publication Data

US 2010/0162089 A1 Jun. 24, 2010

Related U.S. Application Data

(60) Provisional application No. 61/139,659, filed on Dec. 22, 2008, provisional application No. 61/139,662, filed on Dec. 22, 2008.

(51) Int. Cl.
*G06F 11/00* (2006.01)
(52) U.S. Cl. ............. 714/776; 714/52; 370/473; 725/54
(58) Field of Classification Search ........................ None
See application file for complete search history.

(56) References Cited

U.S. PATENT DOCUMENTS

| | | | |
|---|---|---|---|
| 6,115,074 A | 9/2000 | Ozkan | |
| 2003/0123484 A1 | 7/2003 | Harriman | |
| 2004/0017831 A1 | 1/2004 | Shen | |
| 2006/0056407 A1 | 3/2006 | Hashimoto | |
| 2007/0088877 A1 | 4/2007 | Chen | |
| 2007/0130613 A1 | 6/2007 | Choi | |
| 2007/0160042 A1 | 7/2007 | Dollo | |
| 2008/0002742 A1* | 1/2008 | Wu | ............................. 370/476 |
| 2008/0008155 A1 | 1/2008 | Yoon | |
| 2008/0060046 A1 | 3/2008 | Lee | |
| 2008/0162639 A1 | 7/2008 | Kang | |

(Continued)

FOREIGN PATENT DOCUMENTS

CN 1722787 A 1/2006

(Continued)

OTHER PUBLICATIONS

International application No. PCT/CN2009/075755, International filing date: Dec. 21, 2009, International Search Report mailing date: Apr. 1, 2010, 10 pages.

(Continued)

*Primary Examiner* — Christopher McCarthy

(74) *Attorney, Agent, or Firm* — Winston Hsu; Scott Margo

(57) ABSTRACT

A packet processing apparatus includes a packet identifying unit and a packet modifying unit. The packet identifying unit is utilized for receiving a plurality of packets and checking identification information derived from the received packets to identify first packets from the received packets. The packet modifying unit is coupled to the packet identifying unit, and is utilized for checking payloads of the first packets to identify second packets from the first packets, where each of the second packets has specific data included in a payload thereof, and for modifying at least the payload of each of the second packets.

20 Claims, 10 Drawing Sheets

U.S. PATENT DOCUMENTS

| | | | |
|---|---|---|---|
| 2008/0240093 | A1 | 10/2008 | Morad |
| 2010/0158042 | A1* | 6/2010 | Yeh et al. .................. 370/465 |
| 2010/0229203 | A1 | 9/2010 | Lee |

FOREIGN PATENT DOCUMENTS

| | | |
|---|---|---|
| CN | 101605204 A | 12/2009 |
| EP | 1 808 994 A1 | 7/2007 |
| EP | 1 909 420 A1 | 4/2008 |
| JP | P2008141618 A | 6/2008 |
| WO | 0197526 A1 | 12/2001 |
| WO | 2006113302 A1 | 10/2006 |

OTHER PUBLICATIONS

International application No. PCT/CN2009/075773, International filing date: Dec. 21, 2009, International Search Report mailing date: Apr. 1, 2010, 10 pages.

International application No. PCT/CN2009/075761, International filing date: Dec. 21, 2009, International Search Report mailing date: Apr. 1, 2010, 12 pages.

* cited by examiner

Bit Stream Syntax for the Terrestrial Virtual Channel Table

| Syntax | No. of Bits | Format |
|---|---|---|
| terrestrial_virtual_channel_table_section(){ | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_In_section | 8 | uimsbf |
|   for (i=0; i< num_channels_in_section; i++){ | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrie_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i< N; i++){ | | |
|       descriptor() | | |
|     } | | |
|   } | | |
|   reserved | 6 | '111111' |
|   additional_descriptors_length | 10 | uimsbf |
|   for (j=0; j< N; j++){ | | |
|     additional_descriptor() | | |
|   } | | |
|   CRC_32 | 32 | rpchcf |
| } | | |

FIG. 4

Bit Stream Syntax for the Service Location Descriptor

| Syntax | No. of Bits | Format |
|---|---|---|
| service_location_descriptor() { | | |
|   descriptor_tag | 8 | 0xC8 |
|   descriptor_length | 1 | '1' |
|   reserved | 1 | '1' |
|   PCR_PID | 2 | '11' |
|   number_elements | 12 | uimsbf |
|   for (i=0; i< number_elements; i++){ | | |
|     stream_type | 8 | uimsbf |
|     reserved | 3 | '111' |
|     elementary_PID | 13 | uimsbf |
|     ISO_639_language_code | 8*3 | uimsbf |
|   } | | |
| } | | |

PACKET PROCESSING APPARATUS AND METHOD CAPABLE OF GENERATING MODIFIED PACKETS BY MODIFYING PAYLOADS OF SPECIFIC PACKETS IDENTIFIED FROM RECEIVED PACKETS

CROSS REFERENCE TO RELATED APPLICATIONS

This application claims the benefit of U.S. Provisional Application No. 61/139,659 and U.S. Provisional Application No. 61/139,662, both filed on Dec. 22, 2008 and incorporated herein by reference.

BACKGROUND

The disclosed embodiments of the present invention relate to processing packets, and more particularly, to a packet processing apparatus and method capable of generating modified packets by modifying payloads of specific packets identified from received packets.

In contrast to the analog television system using analog signals to carry audio and video information, a digital television (DTV) system sends and receives audio and video information by means of digital signals. For example, at the transmitter end, the audio and video information to be transmitted is first packetized into transport stream (TS) packets, and then the TS packets are modulated and transmitted by broadcasting techniques. Regarding the receiver end, a demodulator block is required for demodulating a modulated input signal received via a tuner and an antenna to reproduce TS packets from the modulated input signal, and a demultiplexer block following the demodulator block is required to identify and demultiplex packets to store video packets, audio packets, program and system information protocol (PSIP) packets into respective storage spaces. Next, the video packets, audio packets, PSIP packets will be processed to acquire the desired video information, audio information, and the program and system information, respectively.

In a conventional design, all of the received packets will be demultiplexed and then stored. However, certain packets demultiplexed and stored may carry unwanted information for a following signal processing state, which inevitably increases the packet processing burden of the following data processing stage.

SUMMARY

In accordance with exemplary embodiments of the present invention, a packet processing apparatus and method capable of generating modified packets by modifying payloads of specific packets identified from received packets are proposed. By way of example, not limitation, the unwanted information transmitted via specific packets identified from the received packets can be dropped or masked to alleviate the load of a following data processing stage, leading to higher packet processing efficiency, lower power consumption, and/or lower memory requirement.

According to one aspect of the present invention, an exemplary packet processing apparatus is disclosed. The exemplary packet processing apparatus includes a packet identifying unit and a packet modifying unit. The packet identifying unit is for receiving a plurality of packets and checking identification information derived from the received packets to identify first packets from the received packets. The packet modifying unit is coupled to the packet identifying unit, and is utilized for checking payloads of the first packets to identify second packets from the first packets, where each of the second packets has specific data included in a payload thereof, and modifying at least the payload of each of the second packets.

According to another aspect of the present invention, an exemplary packet processing method is disclosed. The exemplary packet processing method includes: receiving a plurality of packets and checking identification information derived from the received packets to identify first packets from the received packets; checking payloads of the first packets to identify second packets from the first packets, where each of the second packets has specific data included in a payload thereof; and modifying at least the payload of each of the second packets.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram illustrating a bit stream syntax of a virtual channel table section.

FIG. 5 is a diagram illustrating a bit stream syntax of a service location descriptor.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The conception of the present invention is to check identification information derived from received packets (e.g., transport stream packets which comply with advanced television systems committee (ATSC) standard) to identify particular packets each having data of a required table section included in a payload thereof (e.g., any PSIP packet whose payload carrying data of a virtual channel table (VCT) section), check payloads of the particular packets to identify specific packets each having specific data of the required table section (e.g., data of a service location descriptor), and modify the payload of each of the identified specific packets to pre-process the unwanted information. As the unwanted information delivered by the identified specific packets is processed in advance, the packet processing burden of a following data processing stage can be effectively mitigated. Particularly, data of each of the specific packets are not stored into a storage device unless modified to become data of the corresponding modified packet. In other words, data of the identified specific packets are preferably changed prior to being buffered into a storage device. For clarity, certain exemplary embodiments of the present invention are disclosed as follows.

Figure 1:
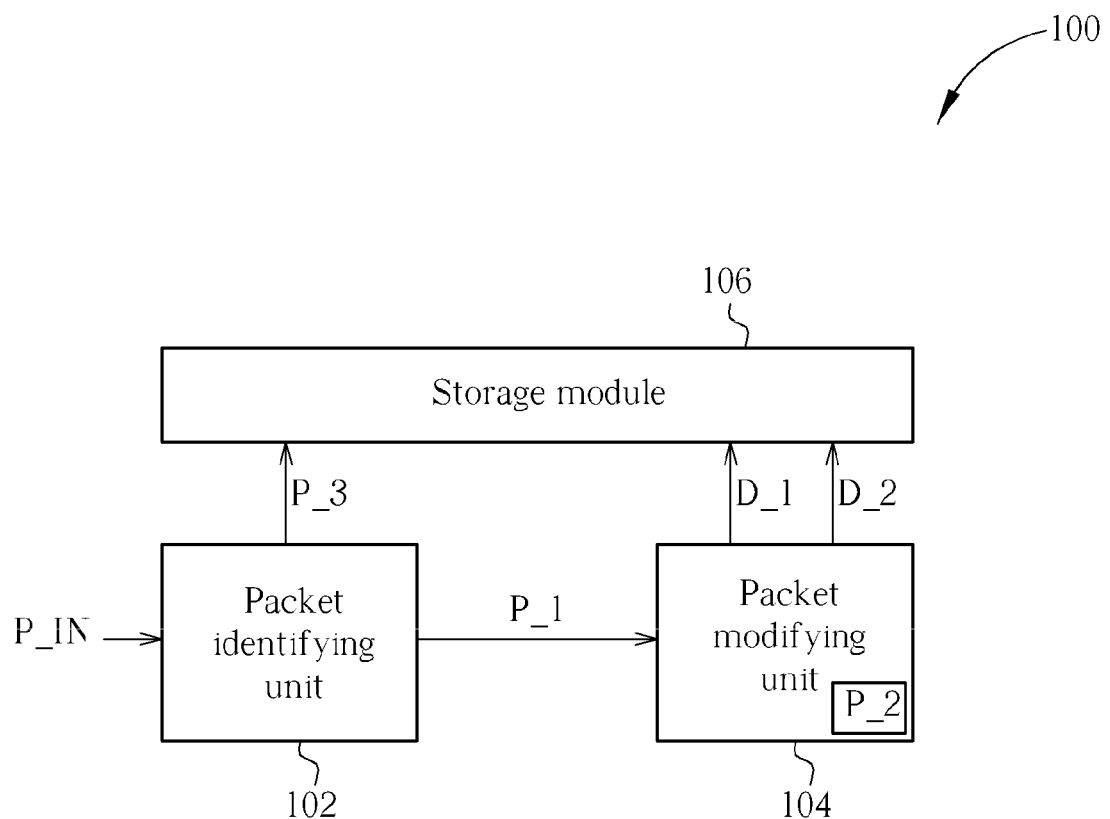
FIG. 1 is a block diagram of a first exemplary embodiment of a packet processing apparatus according to the present invention.

FIG. 1 is a block diagram of a first exemplary embodiment of a packet processing apparatus according to the present invention. The exemplary packet processing apparatus 100 includes, but is not limited to, a packet identifying unit 102, a packet modifying unit 104, and a storage module 106. The packet identifying unit 102 receives a plurality of packets P_IN, and checks identification information derived from the received packets P_IN to identify first packets P_1 from the received packets P_IN. By way of example, but not limitation, each of the first packets P_1 has the same packet identifier (PID) value. The packet identifying unit 102 transmits the identified first packets P_1 to the following packet modifying unit 104, and stores other packets P_3 of the received packets P_IN into the storage module 106. In other words, the output of the packet identifying unit 102 in this embodiment is in a packet format. With regard to the packet modifying unit 104, it is coupled to the packet identifying unit 102 and utilized for identifying second packets P_2 from the first packets P_1 identified by the packet identifying unit 102, where a payload of each of the second packets P_2 contains specific data to be processed. Next, the packet modifying unit 104 modifies at least the payload of each of the identified second packets P_2 to generate a modified packet, and stores data D_2 of the modified packet into the storage module 106. Data D_1 of the remaining first packets P_1 which are not identified as second packets P_2 are stored into the storage module 106 without any modification applied thereto. In short, any packet carrying unwanted information will be finally identified as the aforementioned second packet P_2 through the co-working packet identifying unit 102 and packet modifying unit 104.

It should be noted that the output of the packet modifying unit 104 may be a de-packetized result or in a packet format, depending upon design requirements. For example, in one exemplary implementation, the packet modifying unit 104 modifies the payload of each of the second packets P_2 to generate a modified packet, and stores modified packets respectively corresponding to the second packets P_2 into a packet buffer included in the storage module 106; besides, the packet modifying unit 104 passes the remaining first packets P_1 which are not identified as second packets P_2 to the packet buffer included in the storage module 106. The modified/unmodified packets generated from the packet modifying unit 104 will be further processed by the following data processing stage. In another exemplary implementation, the packet modifying unit 104 modifies the payload of each of the second packets P_2 to generate a modified packet having a modified payload included therein, and stores modified payloads respectively corresponding to the second packets P_2 into the storage module 106; besides, the packet modifying unit 104 stores payloads of the remaining first packets P_1 which are not identified as second packets P_2 to the storage module 106. Therefore, the de-packetized result of the modified/unmodified packets (i.e., payloads derived from the modified/unmodified packets) that is generated from the packet modifying unit 104 will be processed by the following data processing stage. To put it simply, the present invention does not limit the format of the output generated from the packet modifying unit 104; actually, any packet processing mechanism which identifies specific packets each having required data carried by a payload thereof and then changes payload contents of the identified specific packets falls within the scope of the present invention.

The storage module 106 can be implemented using any data storage element(s). For example, the storage module 106 may be a single memory (buffer) having storage areas respectively for different types of packets from the packet identifying unit 102 and the packet modifying unit 104; or the storage module 106 may be a combination of distinct memories (buffers) respectively assigned for different types of packets from the packet identifying unit 102 and the packet modifying unit 104. By way of example, but not limitation, data of each of the second packets P_2 received and identified through the co-working packet identifying unit 102 and packet modifying unit 104 is not stored into the storage module 106 unless modified by the packet modifying unit 104.

Figure 2:
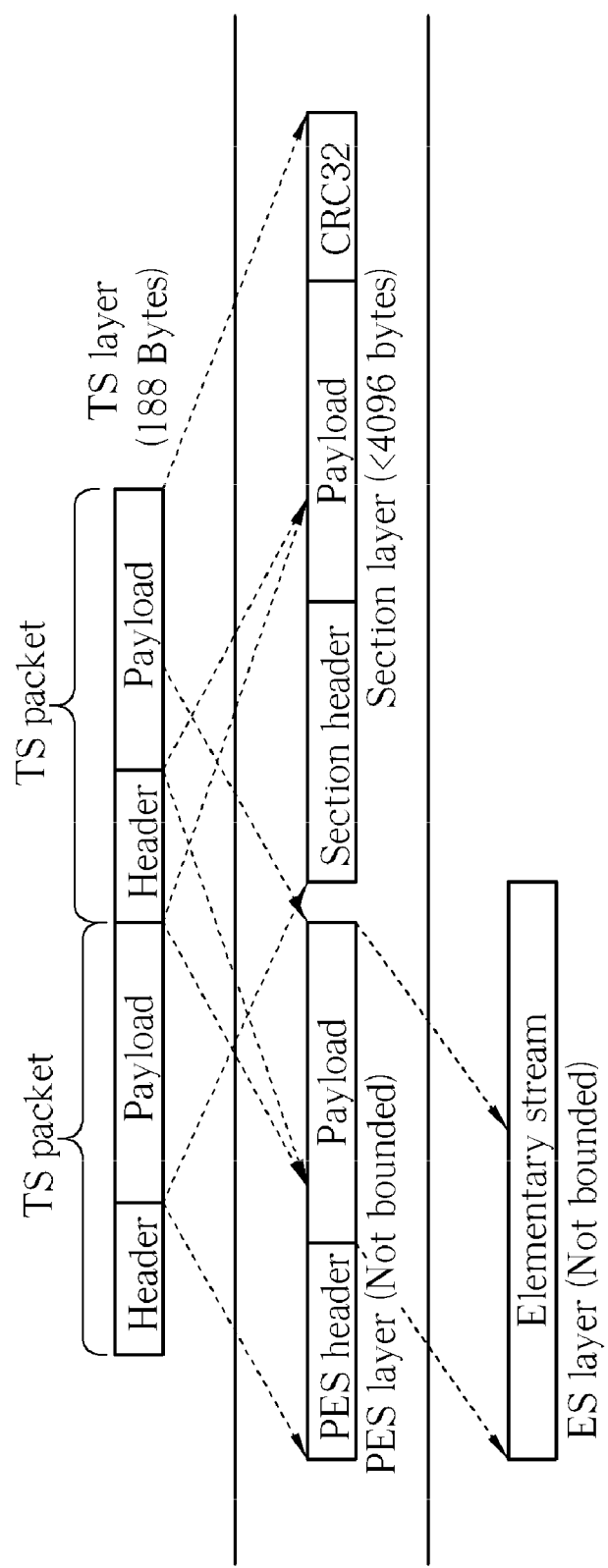
FIG. 2 is a diagram showing a transport stream hierarchy in terms of packet format.
Figure 3:
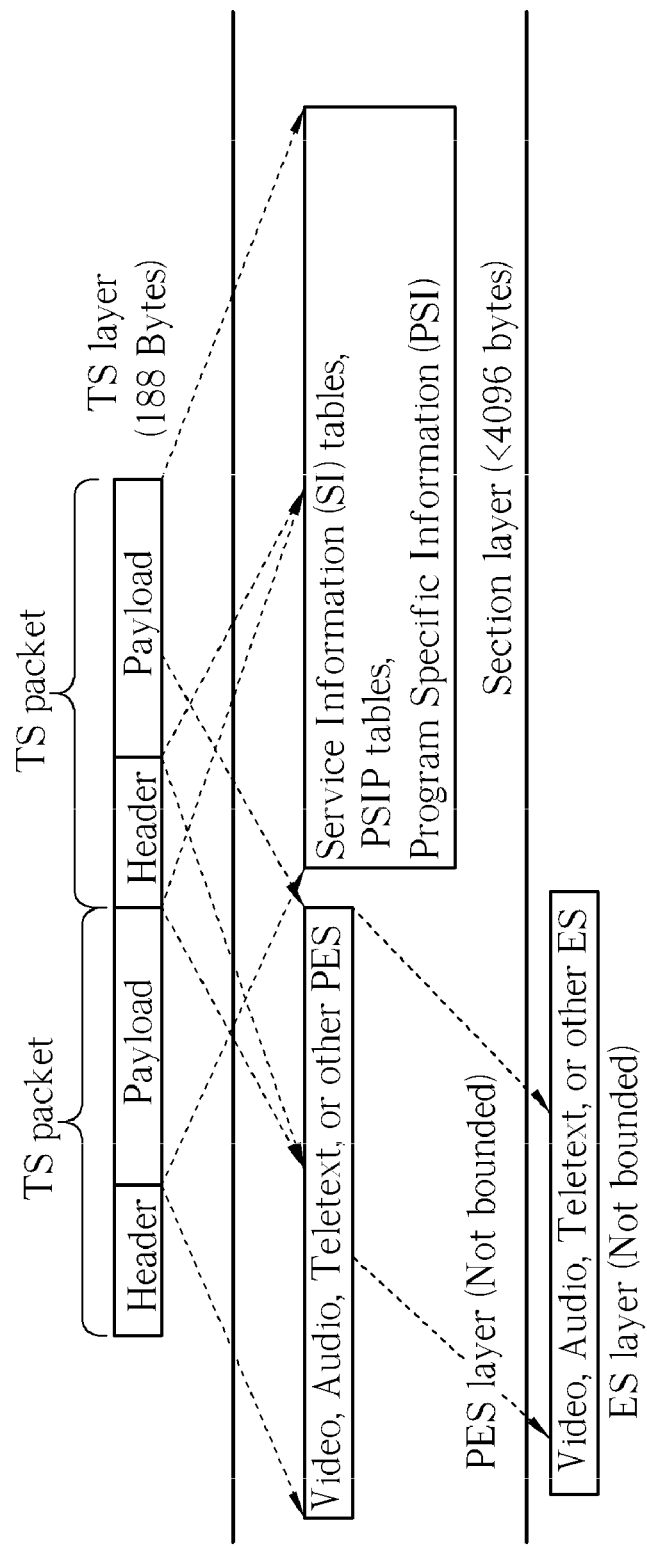
FIG. 3 is a diagram showing a transport stream hierarchy in terms of packet content.

To more clearly describe technical features of the exemplary embodiment shown in FIG. 1, the following takes MPEG compatible packets (e.g., TS packets complying with ATSC standard) as an example. The packet identifying unit 102 is capable of identifying any PSIP packet having a payload carrying data of a virtual channel table (VCT) section. Please refer to FIG. 2 in conjunction with FIG. 3. FIG. 2 is a diagram showing a transport stream hierarchy in terms of packet format, and FIG. 3 is a diagram showing a transport stream hierarchy in terms of packet content. As can be seen from these figures, each TS packet includes a header and a payload. It should be noted that a packet identifier (PID) value is included in the header for indicating the packet type. Payloads of the TS packets can form packet elementary stream (PES) packets and table sections. For example, payloads of the PES packets are used to transmit video data, audio data, etc., and payloads of the table sections are used to transmit service information (SI) tables, PSIP tables, program specific information (PSI), etc. In addition, payloads of the PES packets will form a plurality of elementary streams, such as a video elementary stream, an audio elementary stream, and a data elementary stream. Based on the transport stream hierarchy complying with the ATSC standard, the packet identifying unit 102 is capable of identifying the PSIP packet whose payload carries data of the VCT section, and the packet modifying unit 104 is capable of identifying PSIP packet whose payload carries descriptor data of the VCT section, such as data of a service location descriptor (SLD). For example, the packet identifying unit 102 receives a plurality of TS packets (e.g., P_IN) and compares PID values of the received TS packets with predetermined identification value(s) stored therein. In a case where a comparison result of a PID value of a TS packet and the predetermined identification value(s) indicates that the TS packet is a video packet or audio packet, the identified video/audio packet (e.g., P_3) is stored into a packet buffer included in the storage module 106. In another case where a comparison result of the PID value of a TS packet and the predetermined identification value(s) indicates that the TS packet is a PSIP packet, the packet identifying unit 102 checks if the payload of the PSIP packet contains data of a required table section. For example, if the payload of the PSIP packet includes a table ID of a table section, the packet identifying unit 102 extracts the table ID to determine whether the corresponding table section is a required table section, such as a VCT section. In general, each table section has a designated section length. Therefore, after a required table section is identified by the table ID, the data amount of the required table section can be readily known from the section length information extracted from the required table section. Based on the section length of the required table section, the packet identifying unit 102 knows if the following packets contain data of the required table section. That is, after a section length of a required table section is obtained, the packet with a payload carrying data of the required table section can be easily identified by counting data bits/bytes transmitted. The bit stream syntax of the VCT section is shown in FIG. 4. As can be seen from FIG. 4, the table ID 402 indicates that the table section is a VCT section, the section length 403 indicates the data amount of the VCT section, and the payload of the VCT section contains one or more descriptors 404, where one of the descriptors 404 may be a service location descriptor. Besides, in the end of the VCT section, a 32-bit cyclic redundancy check (CRC) code 406 is included for verifying data correctness of the VCT section.

As mentioned above, the packet identifying unit 102 checks PID values of the received packets P_IN. Therefore, the packet identifying unit 102 can also have the functionality of a conventional PID filter which identifies packet type of each received packet and provides index values to a following packet demultiplexer block to facilitate the packet demultiplexing operation.

When the payload of the PSIP packet contains data of the required table section (e.g., the VCT section), the PSIP packet is identified as the first packet P_1 mentioned above. Before making changes to the PSIP packet identified by the packet identifying unit 102, the packet modifying unit 104 has to determine if the payload of the PSIP packet contains specific data (e.g., descriptor data) in the required table section. By way of example, but not limitation, the packet modifying unit 104 is capable of searching for any PSIP packet having a payload carrying SLD data. The bit stream syntax of the service location descriptor is shown in FIG. 5. As can be seen from FIG. 5, the descriptor tag 502 indicates that the descriptor is a service location descriptor. Therefore, the packet modifying unit 104 checks the descriptor tag of a descriptor found in the VCT section to know if the descriptor is the desired descriptor (e.g., the service location descriptor). When the payload of the PSIP packet is found to contain SLD data, the packet modifying unit 104 categorizes the PSIP packet as a second packet P_2 mentioned above. When the payload of the PSIP packet has no SLD data included therein, the packet modifying unit 104 stores data D_1 of the PSIP packet (i.e., a first packet P_1 not identified as a second packet P_2) into the storage module 106.

It should be noted that a table section is formed by payloads of a plurality of TS packets, and descriptor data of the table section may exist in payloads of some of the TS packets corresponding to the table section. The packet modifying unit 104 is therefore implemented to select second packets P_2 each having a payload carrying the required descriptor data (e.g., SLD data) from the first packets P_1 each having a payload carrying data of the required table section. In one exemplary implementation, the packet modifying unit 104 is configured to modify the payload of each of the second packets P_2 by dropping data of the at least one specific descriptor. Alternatively, the packet modifying unit 104 may be configured to modify the payload of each of the second packets P_2 by replacing data of the at least one specific descriptor with a predetermined data pattern (e.g., 0x00) which acts as a mask.

In general, the SLD data contain program map information; however, the program map information can also be derived from other tables transmitted via the transport stream. For instance, regarding each physical channel, a program association table (PAT) is also transmitted via a transport stream according to the MPEG standard. The PAT lists all programs available in the transport stream delivered via the corresponding physical channel, and each of the listed programs is identified by a program number. In addition, each of the programs listed in the PAT has an associated value of a PID value for its program map table (PMT) that describes which PIDs contain data relevant to the desired program. Even though the SLD data are unavailable from the transport stream, the desired mapping between a virtual channel number and a program number can still be obtained by information derived from these tables. Briefly summarized, the SLD data in the VTC section can be regarded as unwanted information since the program map information can be derived from other tables transmitted via the transport stream. It should be noted that the aforementioned SLD information to be dropped or masked merely serves as one example of the present invention. Other descriptor(s) in the VCT section transmitted via PSIP packets can be dropped or masked, depending upon design requirements. For example, in an exemplary design, all of the descriptors found in a required table section will be dropped or masked. This also obeys the spirit of the present invention.

In view of above, the packet modifying unit 104 pre-processes (drops or masks) detected descriptor(s) transmitted via payloads of the PSIP packets to effectively alleviate the packet processing load of the following data processing stage (e.g., a demultiplexer block). When the unwanted information is masked by a predetermined data pattern (e.g., 0x00), the power consumption can be effectively reduced due to lower transition frequency of the binary bits. When the unwanted information is dropped, the buffering size can be effectively reduced due to reduced data amount.

Please note that the manner for identifying the second packets P_2 from the incoming packets P_IN is not limited to checking the PID value, the table ID, the section length and/or the descriptor tag. Any means capable of identifying particular packets each having data of a required table section included in a payload thereof and then checking payloads of the particular packets to identify specific packets each having specific data of the required table section can be employed by the packet processing apparatus 100.

Figure 6:
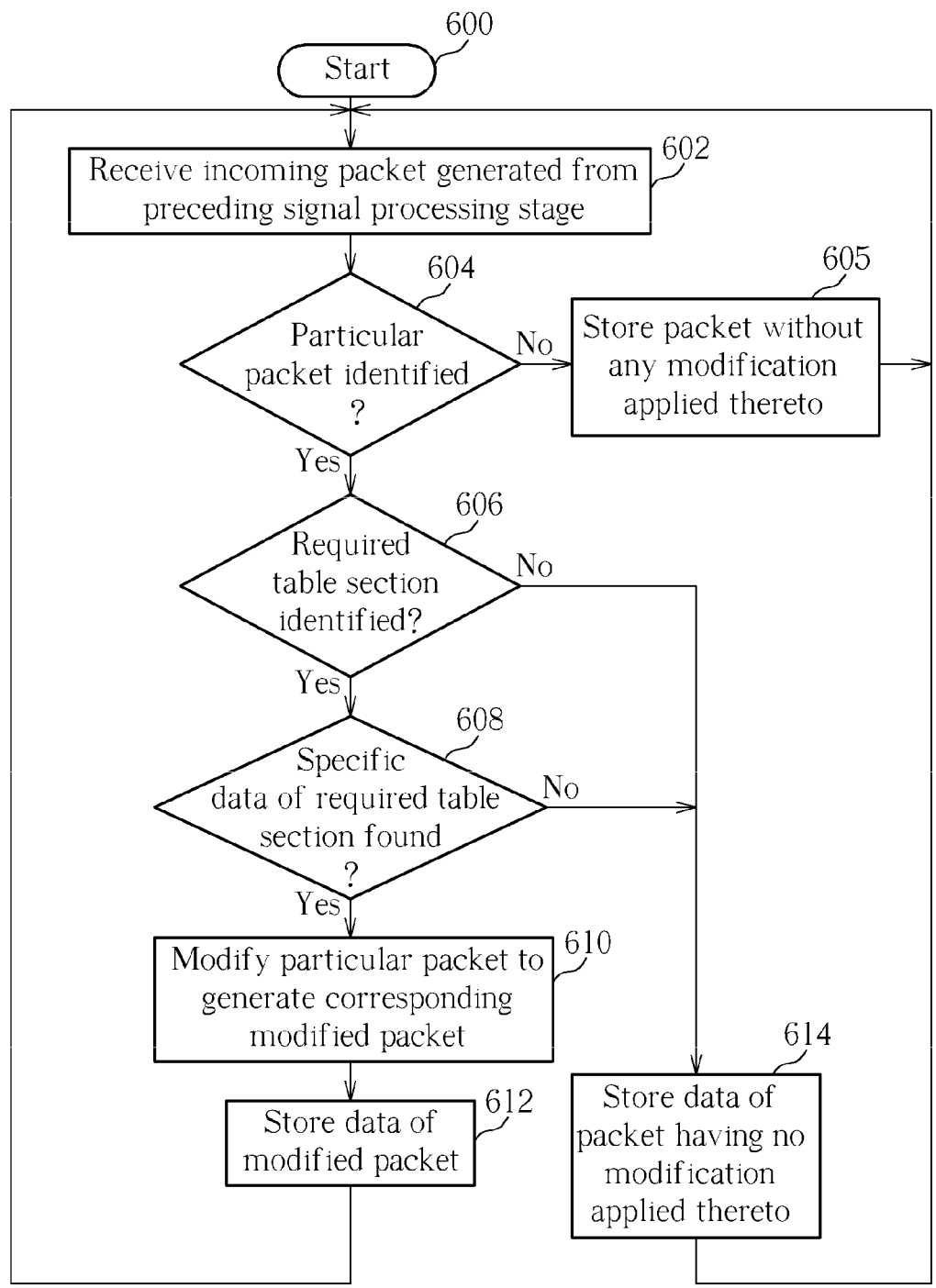
FIG. 6 is a flowchart illustrating a first exemplary embodiment of a packet processing method according to the present invention.

FIG. 6 is a flowchart illustrating a first exemplary embodiment of a packet processing method according to the present invention. Provided that the result is substantially the same, the steps are not required to be performed in the exact order shown in FIG. 6. In this exemplary embodiment, the method is employed by the packet processing apparatus 100 shown in FIG. 1. The exemplary method of the present invention includes following steps:

Step 600: Start.

Step 602: Receive an incoming packet generated from a preceding data processing stage (e.g., a demodulator block).

Step 604: Check a PID value of the incoming packet to see if the incoming packet is a particular packet (e.g., a PSIP packet). If yes, go to step 606; otherwise, go to step 605.

Step 605: Store the packet without any modification applied thereto, and then go to step 602 to check the next packet.

Step 606: Check if the payload of the particular packet carries data of a required table section (e.g., a VCT section). If yes, go to step 608; otherwise, go to step 614. For example, the payload of the particular packet is checked to see if a table ID of the required table section (e.g., the VCT section) is present;

Step 608: Check if the particular packet includes specific data of the required table section. If yes, go to step 610; otherwise, go to step 614. For example, a descriptor tag of a descriptor in the VCT section is checked to see if the payload of the particular packet contains data of one or more descriptors, such as SLD data.

Step 610: Modify at least the payload of the particular packet to generate a corresponding modified packet. For example, the corresponding modified packet is generated by dropping or masking data of one or more descriptors of the required table section.

Step 612: Store data of the modified packet, and then go to step 602 to check the next packet.

Step 614: Store data of the packet having no modification applied thereto, and then go to step 602 to check the next packet.

It should be noted that the flow shown in FIG. 6 will be applied to each packet received by the packet processing apparatus 100. As a person skilled in the art can readily understand the operation of each step shown in FIG. 6 after reading above paragraphs directed to the packet processing apparatus 100 shown in FIG. 1, further description is omitted here for brevity.

In above exemplary embodiment, the packet modifying unit 104 modifies the payload of each of the second packets P_2 to generate a corresponding modified packet. In other words, the payload content of the modified packet generated from the packet modifying unit 104 is different from that of the corresponding second packet P_2. In a case where an error-checking code, such as a cyclic redundancy check (CRC) code, is included in the second packet P_2 to verify data correctness, an error check must be applied to the second packet P_2 instead of the modified packet to retain the benefit of using the CRC code for data correctness verification; otherwise, the intended error-checking functionality would fail to work properly. In the following, exemplary packet processing apparatuses which support the error-checking functionality are proposed.

Figure 7:
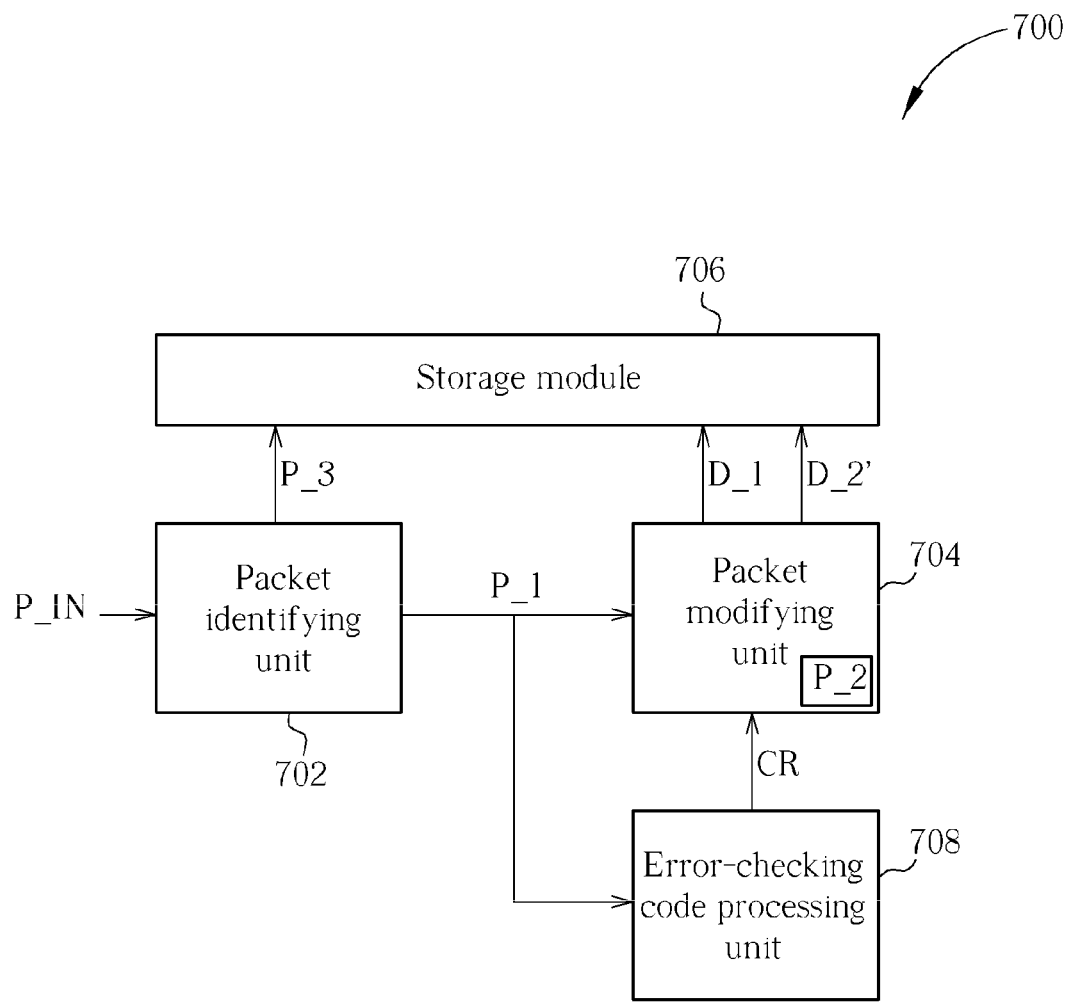
FIG. 7 is a block diagram of a second exemplary embodiment of a packet processing apparatus according to the present invention.

Please refer to FIG. 7, which is a block diagram of a second exemplary embodiment of a packet processing apparatus according to the present invention. The exemplary packet processing apparatus 700 includes, but is not limited to, a packet identifying unit 702, a packet modifying unit 704, a storage module 706, and an error-checking code processing unit 708. As the operation and function of the packet identifying unit 702 are identical to that of the packet identifying unit 102 shown in FIG. 1 and the operation and function of the storage module 706 are identical to that of the storage module 106 shown in FIG. 1, further description is therefore omitted here for brevity. The error-checking code processing unit 708 is utilized for referring to an original error-checking code of a specific table section, which is a specific data section, to perform an error check (e.g., a cyclic redundancy check) upon the specific table section whose data are transmitted via first packets P_1 identified by the packet identifying unit 702, and then generating an error checking result CR of performing the error check upon the specific table section. The error-checking result CR is indicative of data correctness of the specific table section. In other words, the error checking result CR is generated in response to the error check applied to the specific table section derived from payloads of first packets P_1 identified by the packet identifying unit 702.

The packet modifying unit 704 is coupled to the packet identifying unit 702 and the error-checking code processing unit 708, and is utilized for generating data D_1 of unmodified packets and data D_2' of modified packets to the storage module 706. In this exemplary embodiment, the packet modifying unit 704 modifies at least the payload of each of the specific packets P_2 to generate a corresponding modified packet, and then stores data of the modified packets to the storage module 706; in addition, the packet modifying unit 704 is also configured to generate a modified packet by replacing the original error-checking code transmitted via at least one first packet P_1 corresponding to the specific table section with an error checking result CR derived from performing the error check upon the specific table section. It should be noted that it is possible that one first packet P_1 may include both specific data and an original error-checking code, and a modified packet of such a first packet would have the specific data dropped or masked and an error checking result CR taking the place of the original error-checking code. This also obeys the spirit of the present invention. By referring to the error checking result CR of the modified specific table section generated from the packet processing apparatus 700, a following data processing stage can easily and directly know the error-checking status of the modified specific table section without performing any error check upon the modified specific table section.

After reading above paragraphs directed to the signal processing apparatus 100 shown in FIG. 1, a person skilled in the art can readily understand that the output of the packet identifying unit 702 in this embodiment is in a packet format, and the output of the packet modifying unit 704 may be a de-packetized result or in a packet format, depending upon design requirements. Further description is therefore omitted here for brevity.

To more clearly describe technical features of the exemplary embodiment shown in FIG. 7, the following takes TS packets complying with ATSC standard as an example. The packet identifying unit 702 identifies any PSIP packet having a payload carrying data of a VCT section. The error-checking code processing unit 708 is implemented to deal with a CRC code of the VCT section. That is, the error-checking code processing unit 708 performs a CRC upon the VCT section according to an original 32-bit CRC code included in the end of the VCT section, and then obtains an error checking result CR of performing the CRC upon the VCT section. The packet modifying unit 704 detects the specific data including at least one specific descriptor of the VCT section. In one exemplary implementation, the packet modifying unit 704 modifies the payload of each of the second packets P_2 by dropping data of the at least one specific descriptor (e.g., the SLD data). In another exemplary implementation, the packet modifying unit 704 modifies the payload of each of the second packets P_2 by replacing data of the at least one specific descriptor (e.g., the SLD data) with a predetermined data pattern (e.g., 0x00) which acts as a mask. Besides, the packet modifying unit 704 further replaces the original 32-bit CRC code transmitted via a PSIP packet corresponding to the VCT section with the error checking result CR. In this way, the accuracy of the CRC is retained.

Figure 8:
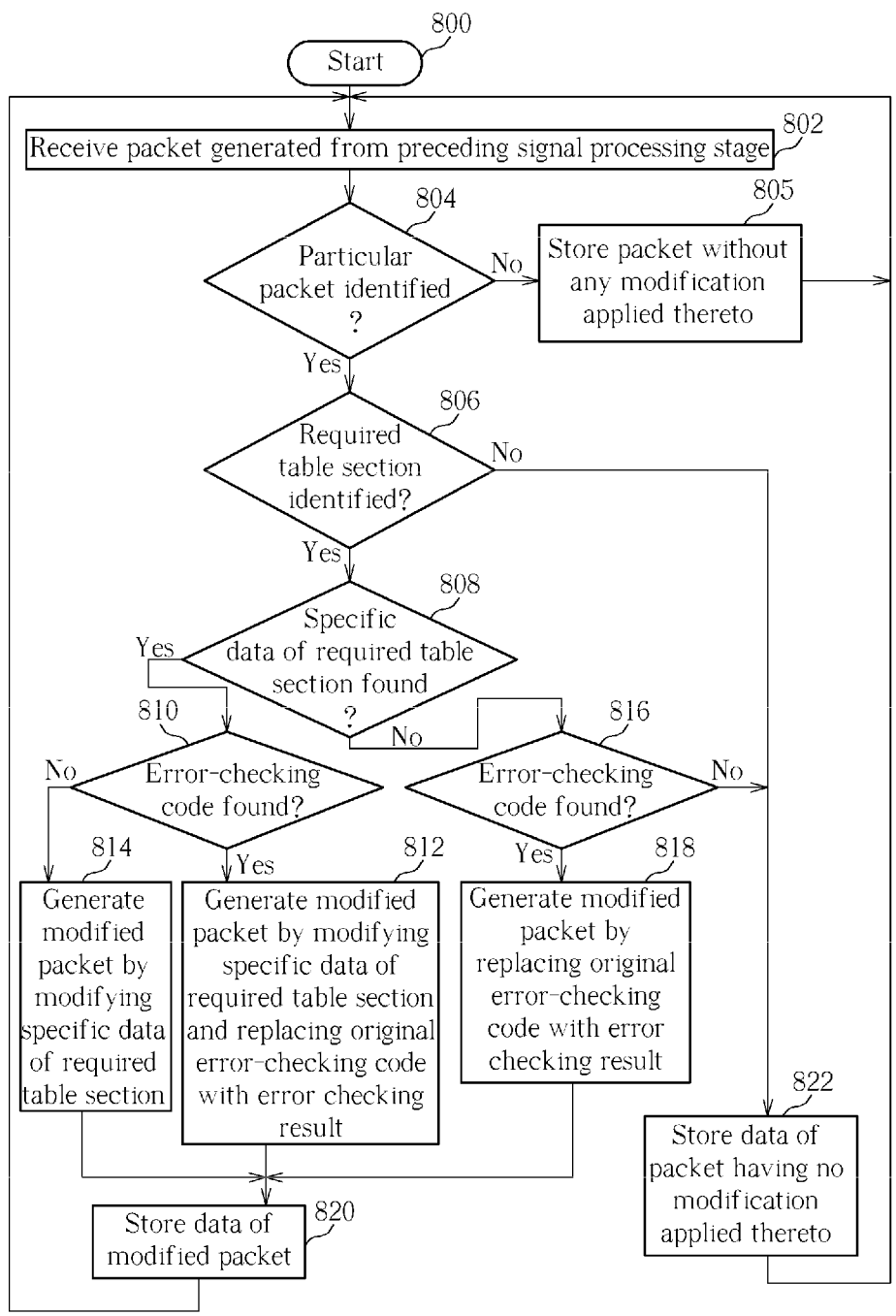
FIG. 8 is a flowchart illustrating a second exemplary embodiment of a packet processing method according to the present invention.

FIG. 8 is a flowchart illustrating a second exemplary embodiment of a packet processing method according to the present invention. Provided that the result is substantially the same, the steps are not required to be performed in the exact order shown in FIG. 8. In this exemplary embodiment, the method is employed by the packet processing apparatus 700 shown in FIG. 7. The exemplary method of the present invention includes following steps:

Step 800: Start.

Step 802: Receive a packet generated from a preceding data processing stage (e.g., a demodulator block).

Step 804: Check a PID value of the packet to see if the packet is a particular packet (e.g., a PSIP packet). If yes, go to step 806; otherwise, go to step 805.

Step 805: Store the packet without any modification applied thereto, and then go to step 802 to check the next packet.

Step 806: Check if the payload of the particular packet carries data of a required table section (e.g., a VCT section). If yes, go to step 808; otherwise, go to step 822. For example, the payload of the particular packet is checked to see if a table ID of the required table section (e.g., the VCT section) is present.

Step 808: Check if the particular packet includes specific data of the required table section. If yes, go to step 810; otherwise, go to step 816. For example, a descriptor tag of a descriptor in the VCT section is checked to see if the payload of the particular packet contains data of one or more descriptors, such as SLD data.

Step 810: Check if the particular packet includes an error-checking code corresponding to the required table section. If yes, go to step 812; otherwise, go to step 814. For example, it is checked to see if the payload of the PSIP packet contains the 32-bit CRC code of the VCT section.

Step 812: Generate a corresponding modified packet by modifying the specific data of the required table section (e.g., dropping or masking data of one or more descriptors of the required table section) and replacing the original error-checking code with an error checking result derived from performing an error check upon the required table section. Go to step 820.

Step 814: Generate a corresponding modified packet by modifying the specific data of the required table section. For example, the corresponding modified packet is generated by dropping or masking data of one or more descriptors of the required table section. Go to step 820.

Step 816: Check if the particular packet includes an error-checking code corresponding to the required table section. If yes, go to step 818; otherwise, go to step 822.

Step 818: Generate a corresponding modified packet by replacing the original error-checking code with an error checking result derived from performing an error check upon the required table section.

Step 820: Store data of the modified packet, and then go to step 802 to check the next packet.

Step 822: Store data of the packet having no modification applied thereto, and then go to step 802 to check the next packet.

It should be noted that the flow shown in FIG. 8 will be applied to each packet received by the packet processing apparatus 700. As a person skilled in the art can readily understand the operation of each step shown in FIG. 8 after reading above paragraphs directed to the packet processing apparatus 700 shown in FIG. 7, further description is omitted here for brevity.

Figure 9:
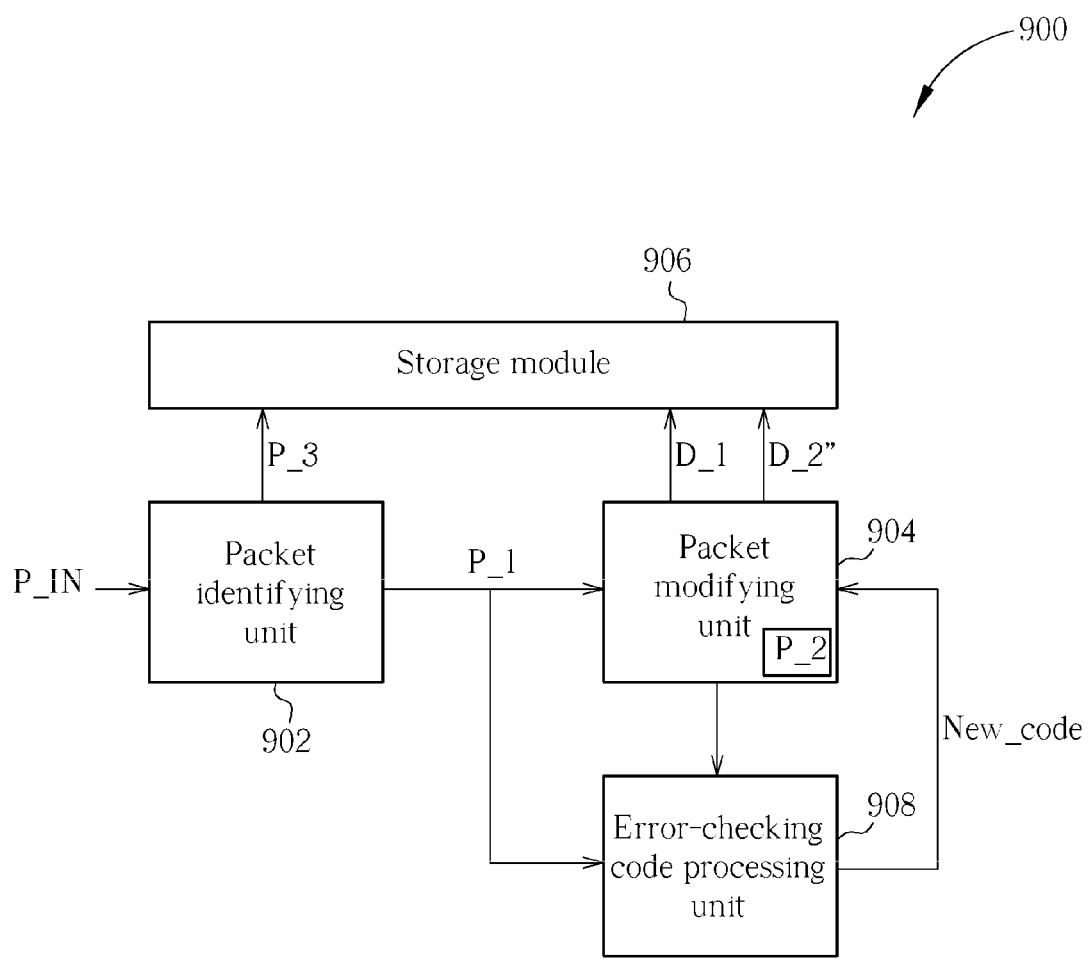
FIG. 9 is a block diagram of a third exemplary embodiment of a packet processing apparatus according to the present invention.

FIG. 9 is a block diagram of a third exemplary embodiment of a packet processing apparatus according to the present invention. The exemplary packet processing apparatus 900 includes, but is not limited to, a packet identifying unit 902, a packet modifying unit 904, a storage module 906, and an error-checking code processing unit 908. As the operation and function of the packet identifying unit 902 are identical to that of the packet identifying unit 102 shown in FIG. 1 and the operation and function of the storage module 906 are identical to that of the storage module 106 shown in FIG. 1, further description is therefore omitted here for brevity.

The packet modifying unit 904 is coupled to the packet identifying unit 902 and the error-checking code processing unit 908, and is utilized for generating data D_1 of unmodified packets and data D_2" of modified packets to the storage module 906. In this exemplary embodiment, the packet modifying unit 904 modifies at least the payload of each of the second packet P_2 to generate a modified packet, and then stores data of the modified packets to the storage module 906. For example, the packet modifying unit 904 drops or masks specific data of a required table section; besides, when an error checking result of performing an error check (e.g., a cyclic redundancy check) upon the original specific table section, which is a specific data section, indicates that the original specific table section passes the error check, the error-checking code processing unit 908 generates an updated error-checking code New_code in response to the modified specific table section, and the packet modifying unit 904 generates a modified packet by replacing the original error-checking code transmitted via at least one first packet P_1 corresponding to the specific table section with the updated error-checking code New_code generated from the error-checking code processing unit 908. It should be noted that it is possible that one first packet P_1 may include both specific data and an error-checking code, and a modified packet of such a first packet would have specific data dropped or masked and an updated error-checking code New_code taking the place of the original error-checking code. This also obeys the spirit of the present invention. In this way, when the following data processing stage performs an error check upon a modified specific table section, the modified specific table section will pass the error check due to the updated error-checking code New_code included therein.

If the error checking result of performing the error check upon the original specific table section indicates that the original specific table section fails to pass the error check, implying that the original specific table section has error bit(s) included therein, the packet modifying unit 904 in one exemplary implementation would still modify payloads of the specific packets P_2 corresponding to the original specific table section; however, the original error-checking code transmitted via at least one first packet P_1 remains intact. When the following data processing stage performs an error check upon a modified specific table section, the modified specific table section will fail to pass the error check due to the original error-checking code included therein. In this way, the accuracy of the CRC is retained. Please note that this is for illustrative purposes only, and is not meant to be a limitation to the scope of the present invention. In other words, other schemes dealing with the case where the original specific table section fails to pass the error check are also feasible.

To more clearly describe technical features of the exemplary embodiment shown in FIG. 9, the following takes TS packets complying with ATSC standard as an example. The packet identifying unit 902 identifies any PSIP packet having a payload carrying data of a VCT section. The error-checking code processing unit 908 is implemented for dealing with a CRC code of the VCT section. That is, the error-checking code processing unit 908 performs a CRC upon the VCT section according to an original 32-bit CRC code included in the end of the VCT section to determine data correctness of the VCT section. When the VCT section passes the CRC, the error-checking code processing unit 908 generates an updated 32-bit CRC code New_code in response to a modified VCT section generated by the packet modifying unit 904 which modifies payloads of second packets P_2 corresponding to the VCT section. Specifically, the packet modifying unit 904 detects specific data including at least one specific descriptor of the required table section, such as SLD data of the VCT section. In one exemplary implementation, the packet modifying unit 904 modifies the payload of each of the second packets P_2 by dropping data of the at least one specific descriptor (e.g., the SLD data). In another exemplary implementation, the packet modifying unit 904 modifies the payload of each of the second packets P_2 by replacing data of the at least one specific descriptor (e.g., the SLD data) with a predetermined data pattern (e.g., 0x00) which acts as a mask. Furthermore, after receiving the updated 32-bit CRC code New_code from the error-checking code processing unit 908, the packet modifying unit 904 replaces the original 32-bit CRC code transmitted via at least one first packet P_1 corresponding to the VCT section by the updated 32-bit CRC code New_code. However, when the original VCT section is found having error bit(s) included therein, the packet modifying unit 904 will keep the original 32-bit CRC code unchanged to inform the following data processing stage of the existence of error bit(s).

Figure 10:
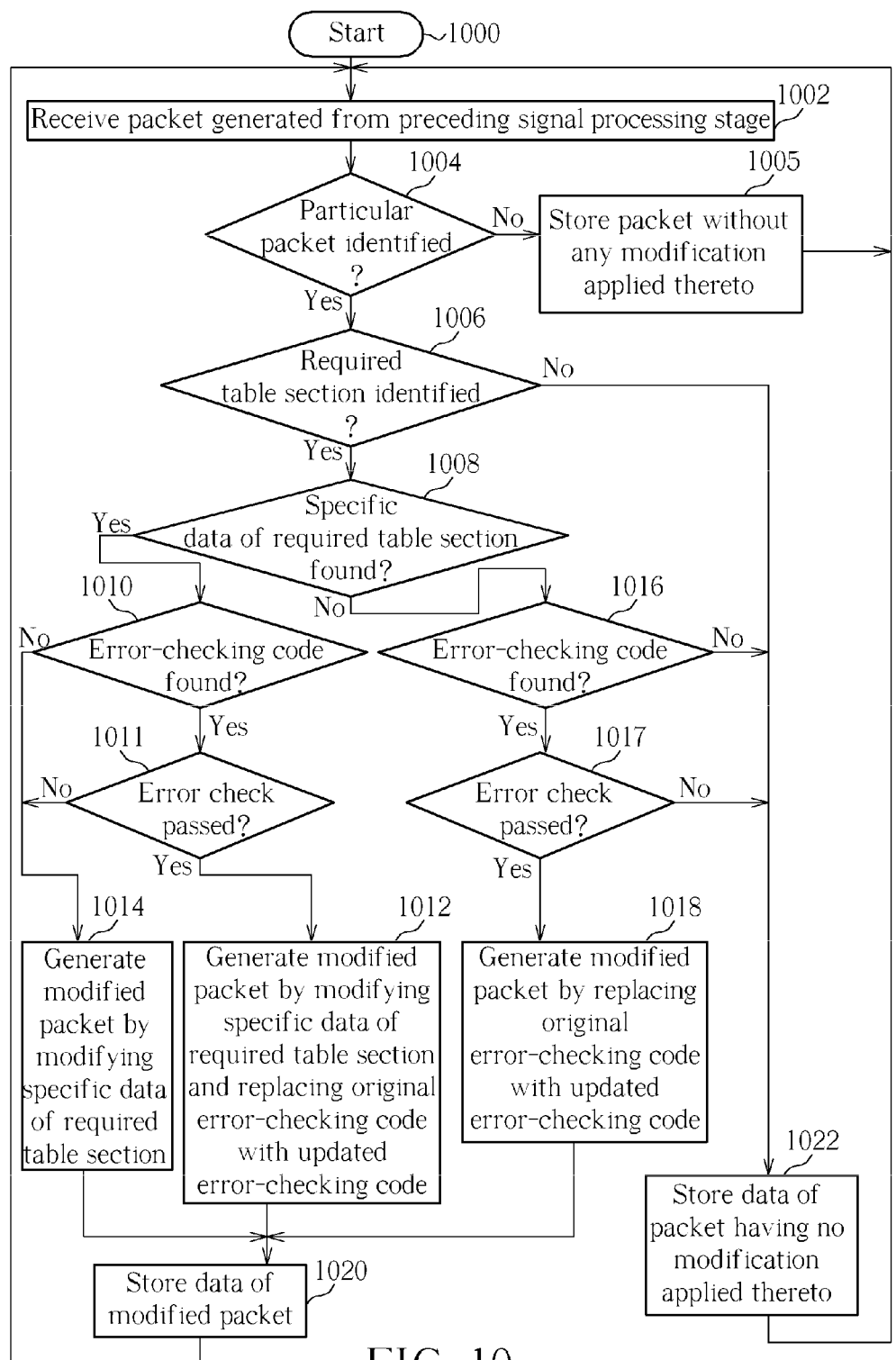
FIG. 10 is a flowchart illustrating a third exemplary embodiment of a packet processing method according to the present invention.

FIG. 10 is a flowchart illustrating a third exemplary embodiment of a packet processing method according to the present invention. Provided that the result is substantially the same, the steps are not required to be performed in the exact order shown in FIG. 10. In this exemplary embodiment, the method is employed by the packet processing apparatus 900 shown in FIG. 9. The exemplary method of the present invention includes following steps:

Step 1000: Start.

Step 1002: Receive a packet generated from a preceding data processing stage (e.g., a demodulator block).

Step 1004: Check a PID value of the packet to see if the packet is a particular packet (e.g., a PSIP packet). If yes, go to step 1006; otherwise, go to step 1005.

Step 1005: Store the packet without any modification applied thereto, and then go to step 1002 to check the next packet.

Step 1006: Check if the payload of the particular packet carries data of a required table section (e.g., a VCT section). If yes, go to step 1008; otherwise, go to step 1022. For example, the payload of the particular packet is checked to see if a table ID of the required table section is present.

Step 1008: Check if the particular packet includes specific data of the required table section. If yes, go to step 1010; otherwise, go to step 1016. For example, a descriptor tag of a descriptor in the VCT section is checked to see if the payload of the particular packet contains data of one or more descriptors, such as SLD data.

Step 1010: Check if the particular packet includes an error-checking code corresponding to the required table section. If yes, go to step 1011; otherwise, go to step 1014. For example, it is checked to see if the payload of the PSIP packet contains the 32-bit CRC code of the VCT section.

Step 1011: Check if the required table section passes the error check. If yes, go to step 1012; otherwise, go to step 1014.

Step 1012: Generate a corresponding modified packet by modifying the specific data of the required table section (e.g., dropping or masking data of one or more descriptors of the required table section) and replacing the original error-checking code with an updated error-checking code generated in response to modified specific data of the required table section. Go to step 1020.

Step 1014: Generate a corresponding modified packet by modifying the specific data of the required table section. For example, the corresponding modified packet is generated by dropping or masking data of one or more descriptors of the required table section. Go to step 1020.

Step 1016: Check if the particular packet includes an error-checking code corresponding to the required table section. If yes, go to step 1017; otherwise, go to step 1022.

Step 1017: Check if the required table section passes the error check. If yes, go to step 1018; otherwise, go to step 1022.

Step 1018: Generate a corresponding modified packet by replacing the original error-checking code with an updated error-checking code generated in response to modified specific data of the required table section.

Step 1020: Store data of the modified packet, and then go to step 1002 to check the next packet.

Step 1022: Store data of the packet having no modification applied thereto, and then go to step 1002 to check the next packet.

It should be noted that the flow shown in FIG. 10 will be applied to each packet received by the packet processing apparatus 900. As a person skilled in the art can readily understand the operation of each step shown in FIG. 10 after reading above paragraphs directed to the packet processing apparatus 900 shown in FIG. 9, further description is omitted here for brevity.

Please note that when one or more descriptors of the required table section are dropped, the actual data amount is changed accordingly. Therefore, any related data length field/parameter should be adjusted accordingly. Moreover, in one exemplary implementation, the elements of the exemplary packet processing apparatus 100, 700, 900 can be external to the demodulator block and the demultiplexer block; however, in an alternative implementation, the elements of the exemplary packet processing apparatus can be partially or fully integrated in the demodulator block, or partially or fully integrated in the demultiplexer block. These all fall within the scope of the present invention.

By way of example, the identification processing performed by the packet identifying units 102, 702, 902 and the modification processing performed by the packet modifying units 104, 704, 904 may employ a packet-based processing scheme or a byte-based processing scheme, depending upon the actual design consideration. In a case where the packet-based processing scheme is employed, the packet identifying units 102, 702, 902 would check each incoming complete packet to determine how to deal with the received complete packet, and the packet modifying units 104, 704, 904 would check each incoming complete packet to determine how to deal with the received complete packet. In another case where the byte-based processing scheme is employed, the packet identifying units 102, 702, 902 would check each incoming byte to determine how to deal with the received byte, and the packet modifying units 104, 704, 904 would check each incoming byte to determine how to deal with the received byte. In this way, data processing of a packet is allowed to begin prior to receiving the whole data of the packet; in other words, the packet data processing, including the identification processing and the modification processing, does not need to wait for the data reception of a complete packet. However, the packet data processing scheme (e.g., a packet-based processing scheme or a byte-based processing scheme) employed by the packet identifying units 102, 702, 902 and the packet modifying units 104, 704, 904 is not meant to be taken as a limitation to the scope of the present invention. That is, as long as the same objective of pre-processing the unwanted information (e.g., SLD data of a VCT section) via the co-working packet modifying unit and packet modifying unit is achieved, the transport stream data can be processed on a byte basis, on a packet basis, or on the basis of any data size. These all fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A packet processing apparatus, comprising:
   a packet identifying unit, for receiving a plurality of packets and checking identification information derived from the received packets to identify first packets from the received packets; and
   a packet modifying unit, coupled to the packet identifying unit, for checking payloads of the first packets to identify second packets from the first packets, where each of the second packets has specific data included in a payload thereof, and for modifying at least the payload of each of the second packets.

2. The packet processing apparatus of claim 1, further comprising:
   a storage module, coupled to the packet modifying unit, for storing data of modified packets respectively corresponding to the second packets;
   wherein data of each of the second packet identified through the packet identifying unit and the packet modifying unit are not stored into the storage module unless modified by the packet modifying unit.

3. The packet processing apparatus of claim 1, wherein each of the first packets is a program and system information protocol (PSIP) packet, and the specific data include data of at least one specific descriptor of a specific table section.

4. The packet processing apparatus of claim 3, wherein the specific table section is a virtual channel table (VCT) section.

5. The packet processing apparatus of claim 4, wherein the at least one specific descriptor includes a service location descriptor.

6. The packet processing apparatus of claim 3, wherein the packet modifying unit modifies each of the second packets by dropping the data of the at least one specific descriptor.

7. The packet processing apparatus of claim 3, wherein the packet modifying unit modifies each of the second packets by replacing data of the at least one specific descriptor with a predetermined data pattern.

8. The packet processing apparatus of claim 1, wherein the payloads of the first packets contain an original error-checking code of a specific data section, the specific data include data of the specific data section, and the packet processing apparatus further comprises:
   an error-checking code processing unit, for performing an error check upon the specific data section according to the original error-checking code, wherein the packet modifying unit further modifies the original error-checking code.

9. The packet processing apparatus of claim 8, wherein the error-checking code processing unit generates an error checking result of performing the error check upon the specific data section, and the packet modifying unit replaces the original error-checking code transmitted via at least one first packet corresponding to the specific data section with the error checking result.

10. The packet processing apparatus of claim 8, wherein when an error checking result of performing the error check upon the specific data section indicates that the specific data section passes the error check, the error-checking code processing unit generates an updated error-checking code for a modified specific data section corresponding to the specific data section, and the packet modifying unit replaces the original error-checking code transmitted via at least one first packet corresponding to the specific data section with the updated error-checking code.

11. A packet processing method employed in a packet processing apparatus, comprising:
   receiving a plurality of packets and checking identification information derived from the received packets to identify first packets from the received packets;
   checking payloads of the first packets to identify second packets from the first packets, where each of the second packets has specific data included in a payload thereof; and
   modifying at least the payload of each of the second packets.

12. The packet processing method of claim 11, further comprising:
   utilizing a storage module to store data of modified packets respectively corresponding to the second packets;
   wherein data of each of the second packet are not stored into the storage device unless modified to become data of the corresponding modified packet.

13. The packet processing method of claim 11, wherein each of the first packets is a program and system information protocol (PSIP) packet, and the specific data include data of at least one specific descriptor of a specific table section.

14. The packet processing method of claim 13, wherein the specific table section is a virtual channel table (VCT) section.

15. The packet processing method of claim 14, wherein the at least one specific descriptor includes a service location descriptor.

16. The packet processing method of claim 13, wherein modifying each of the second packets comprises:
   dropping the data of the at least one specific descriptor.

17. The packet processing method of claim 13, wherein modifying each of the second packets comprises:
   replacing data of the at least one specific descriptor with a predetermined data pattern.

18. The packet processing method of claim 11, wherein the payloads of the first packets contain an original error-checking code of a specific data section, the specific data include data of the specific data section, and the packet processing method further comprises:
   performing an error check upon the specific data section according to the original error-checking code; and
   modifying the original error-checking code.

19. The packet processing method of claim 18, wherein modifying the original error-checking code comprises:
   replacing the original error-checking code transmitted via at least one first packet corresponding to the specific data section with an error checking result of performing the error check upon the specific data section.

20. The packet processing method of claim 18, further comprising:
   when an error checking result of performing the error check upon the specific data section indicates that the specific data section passes the error check, generating an updated error-checking code for a modified specific data section corresponding to the specific data section;
   wherein modifying the original error-checking code comprises:
   replacing the original error-checking code transmitted via at least one first packet corresponding to the specific data section with the updated error-checking code.

* * * * *